United States Patent [19]
Leibach

[11] 3,837,578
[45] Sept. 24, 1974

[54] TURBOJET ENGINES WITH PIVOTING JET PIPE AND THRUST REVERSING MEANS

[75] Inventor: Heinrich Leibach, Grafrath-Wildenroth, Germany

[73] Assignee: Motoren-und Turbinen-Union Munchen GmbH, Munich, Germany

[22] Filed: Oct. 3, 1973

[21] Appl. No.: 402,907

[30] Foreign Application Priority Data
Oct. 3, 1972 Germany............................ 2248480

[52] U.S. Cl....................... 239/265.35, 239/265.37
[51] Int. Cl........................ B64c 9/38, B64c 15/04
[58] Field of Search..... 239/265.19, 265.33, 265.35, 239/265.37; 181/33 HD

[56] References Cited
UNITED STATES PATENTS

| | | | |
|---|---|---|---|
| 3,003,312 | 10/1961 | Jewell | 239/265.37 X |
| 3,319,892 | 5/1967 | Zirin | 239/265.35 |
| 3,525,487 | 8/1970 | Kopp | 239/265.37 X |
| 3,612,399 | 10/1971 | Rodgers | 239/265.37 X |
| 3,667,680 | 6/1972 | Weed | 181/33 HD |
| 3,684,182 | 8/1972 | Maison | 239/265.35 X |

*Primary Examiner*—Robert S. Ward, Jr.
*Attorney, Agent, or Firm*—Craig & Antonelli

[57] ABSTRACT

A jet exhaust control arrangement for controlling the exhausting of thrust gases supplied by turbo jet engines. The arrangement includes a fixed pipe section for accepting gases from the engine and at least one further downstream pipe section which is pivotal with respect to the fixed pipe section for effecting changes in the direction of the exhausting of gases through a nozzle arranged at the downstream end of the pivotal pipe section. Thrust reversing deflecting flaps are mounted for movement with the pivotal pipe section and are movable into and out of the exhaust of the nozzle for effecting a reversal of the thrust forces. The pivoting movement of the pivotal pipe section and the movement of the deflecting elements into and out of the exhaust gas stream is controlled so as to accommodate an effective attitude control by the combination of selecting the exhaust direction and the amount of thrust reversal.

23 Claims, 3 Drawing Figures

TURBOJET ENGINES WITH PIVOTING JET PIPE AND THRUST REVERSING MEANS

BACKGROUND AND SUMMARY OF THE INVENTION

This invention relates to a turbojet engine having a pivoting or swiveling jet pipe and a thrust reversing means operated by deflector elements which can be pivoted into the gas jet.

A thrust reversing means of the said generic category affords an advantage by the relatively moderate length of the entire engine system when comparing it with arrangements where the thrust reversing means is arranged, together with flaps for intercepting the horizontally directed exhaust gas stream and with lateral gas exit ports, including additional, optionally opened or closed jet deflector cascades, between the end of the engine and a jet pipe associated with a thrust nozzle.

In the interest of reduced over-all length of such an engine system it has been contemplated to combine the thrust reversing means structurally with the jet pipe. Such an arrangement requires providing optionally closed ports in the jet pipe and installing some of the means for inducing gas deflection within the jet pipe, all of which cause flow, strength and thermal problems.

A further arrangement has been contemplated which additionally utilizes those thrust jets which are deflected laterally and obliquely forward to decelerate an aircraft for attitude control. Since, in this phase (thrust reversal) of flight operation, the deflected thrust jets affect the outside air flow and may largely preclude effective lateral or vertical empennage control especially when the jet engine and its associated thrust reversing means are arranged in the empennage area of the aircraft, such attitude control is needed.

This last-mentioned arrangement nevertheless revolves around a thrust reversing means arranged between the end of the engine and a jet pipe, or around a jet deflecting means having a thrust nozzle, and it therefore has the deficiencies of considerable length and relatively high weight of the entire engine system.

German Pat. application DAS 2,140,217 describes an arrangement with a jet engine, a thrust reverser and a swivel mounted jet pipe in series with one another where gas flow to the jet pipe is shut off by way of flaps which direct engine gases to the thrust reverser during thrust reverser operation. During thrust reverser operation, steering movements can therefore not be supported directly with the jet pipe. Therefore, this DAS 2,140,217 uses a turnable cascade of vane members for the thrust reverser to provide turnable reverse flow jets to aid in steering movements of the aircraft during thrust reverser operation.

The present invention contemplates an improved turbojet engine arrangement which overcomes the above-discussed disadvantages and has a thrust reversing means and a pivoting or swiveling jet pipe configured such that control of the aircraft by means of the gas jets deflected during thrust reversing operation is achieved in as a simple a fashion as practicable.

It is further more specifically contemplated by this invention to provide an engine where the thrust reversing means is arranged on the jet pipe for pivoting or swiveling movement together with it.

In a preferred embodiment of the present invention, the jet pipe and thus the gas jet discharged by the engine can be pivoted at will three-dimensionally to achieve various aircraft attitude control maneuvers. Then when the jet deflector flaps of the thrust reversing means associated with the jet pipe are deployed during the thrust reversing process into the gas jet downstream of the thrust nozzle in, for example, umbrella-fashion, the resultant combustion thrust component can within limits be varied three-dimensionally for attitude control purposes merely by guiding the movement of the jet pipe accordingly, with no need to vary the selected end position of the jet deflector flaps. This will permit, amongst others, a so-termed negative lift thrust to be achieved in the interest of aircraft stabilization when with reference to an arrangement on the aircraft for, e.g., vertical take-off or landing the jet pipe is aimed downward and the jet deflector flaps of the thrust reversing means are only partially pivoted into the gas jet.

In a further preferred embodiment of the present invention, use is made of a jet pipe which is formed by fixedly mounted pipe sections as well as pipe sections which are supported one against the other for relative rotational angular movement. The thrust reversing means is arranged on at least one pipe section which will not turn when the remaining pipe sections are rotated relative to each other, preferably on a final pipe section fitted with a thrust nozzle.

With this last-mentioned embodiment, the gas jet to be deflected is subjected to no more than a relatively moderately curved course and, thus, to relatively moderate flow losses.

By arranging the thrust reversing means on a non-rotating pipe section, the supply lines needed for operating the actuating means for the jet deflector flaps need only be arranged to follow the pivotal movement of this pipe section without considering relative rotational pipe movements.

In a further aspect of this invention, the jet pipe or that of its pipe sections which will not rotate when the remaining pipe section are in relative rotation is associated with a fairing section which forms a continuation of the aircraft fuselage and into which the jet deflector flaps can be folded when the thrust reversing means is deactuated to reduce aerodynamic losses to a minimum.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
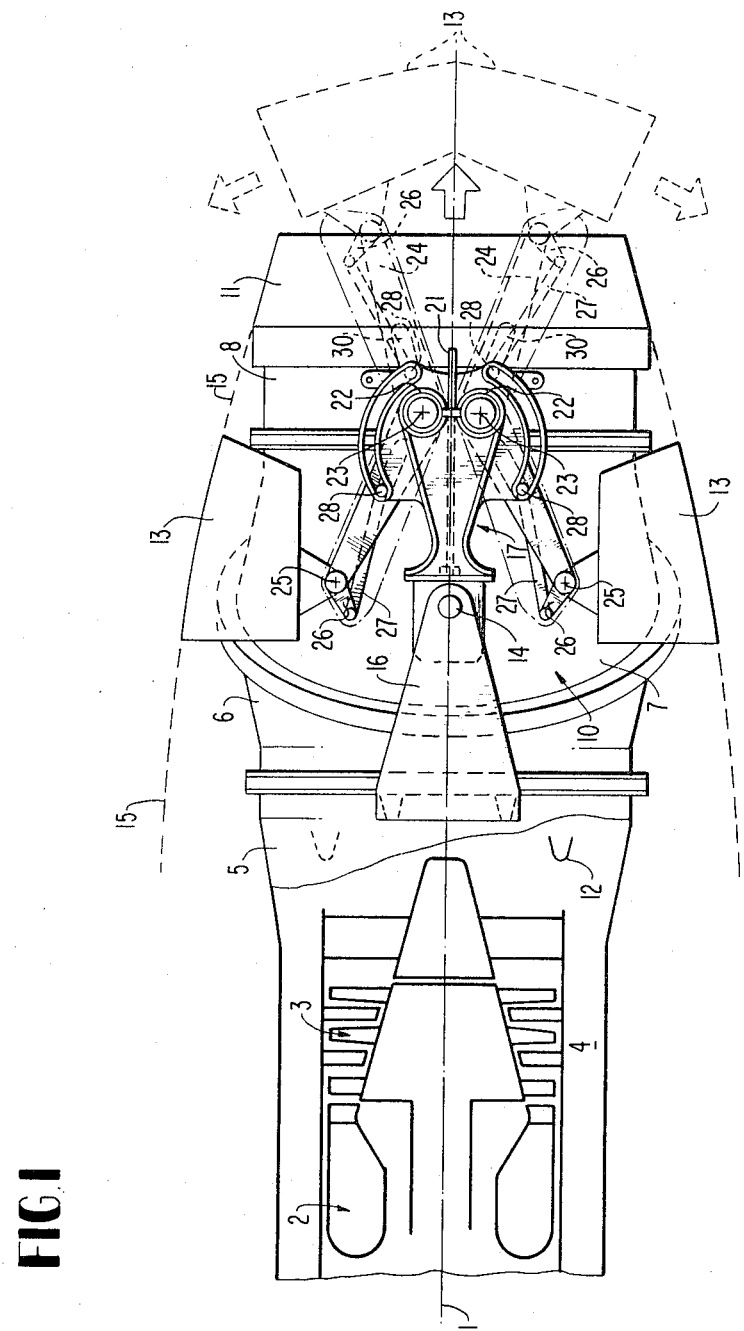
FIG. 1 is a part cross-sectional schematic side view of a turbojet engine with a jet exhaust control arrangement constructed in accordance with a preferred embodiment of the present invention and with the jet pipe shown in a first extreme position.

FIG. 1 shows a turbojet engine with a part thereof broken away for clarity and illustrates—arranged coaxially with the longitudinal centerline 1 of the engine—a combustion chamber system 2 and behind it a multistage turbine 3. Not shown on the drawings is a front fan or a compressor of the engine which discharges compressed air into an annular duct 4 arranged coaxially with the longitudinal centerline 1 of the engine as a bypass airstream. The hot gas strem issuing from the turbine 3 is enveloped by the bypass air stream from duct 4. Both streams enter a jet pipe 10 which here consists of pipe sections 5, 6, 7 and 8.

The pipe section 8 carries at its downstream end a variable nozzle 11, the gas exhaust area of which can be widened when the afterburner is brought into action. A flame holder associated with the afterburning device is generally indicated by the numeral 12. The pipe sections 6 and 7 intervening between the pipe sections 5 and 8 are supported one against the other for relative angular movement such that the gas jet issuing from the thrust nozzle 11 can be directed, e.g., horizontally aft (horizontal flight position of FIG. 1) or vertically down (vertical flight) or diagonally aft and down (short take-off of FIG. 2). For a further detailed description of a practical arrangement for facilitating relative angular movement of the pipe sections, see the copending application Ser. No. 229,305, filed Feb. 25, 1972, the subject matter of which is herein incorporated by reference to the extent necessary to a complete understanding of the present invention.

It will be understood that simultaneous but oppositely directed rotation of the respective pipe section 6, 7 through the same arc will cause the gas jet discharged by the jet engine to be pivoted in the vertical plane passing through the longitudinal centerline 1 of the engine (see especially Page 7, line 6 to Page 8, line 40 of the above-mentioned application Ser. No. 229,305).

A further practical embodiment of a jet pipe arranged for pivotal movement which could be utilized with the present invention is described in U.S. Pat. No. 2,056,088.

The thrust reversing means shown in FIG. 1 include jet deflector flaps 13 which are deployable from the engine fairing 15 (FIG. 1) to produce the intended reverse thrust when, e.g., in the position indicated by broken line.

As will be explained in more detail elsewhere herein the thrust reversing means (including the deflector flaps 13) is held at both sides, once to the fixedly mounted pipe section 5 and then again to the pipe section 8 which will not rotate when the pipe sections 6, 7 are in relative rotation. Attention is also directed to my copending application titled "Apparatus for Thrust Reversal" and filed on Aug. 27, 1973 for a further detailed description of deflector flap actuating mechanisms that could be used with the present invention.

When the gas jet is pivoted in the vertical plane by appropriate relative rotation of the pipe sections 6, 7, the thrust reverser means is also pivoted in this vertical plane about the lateral bearing points 14. When this pivoting takes place with the thrust reverser in action, i.e., with the jet deflector flaps 13 deployed into the gas stream, additional attitutde control forces are obtained to raise or lower the aircraft tail during the landing approach or to restore the tail to the horizontal position should it leave same. These additional attitude control forces are obtained at no more than a relatively moderate reduction in the braking effort achieved when the jet deflector flaps 13 are normally deployed in the straight position of the jet pipe 10.

The means needed in conjunction with the thrust deflecting means for folding and deploying the jet deflector flaps 13 are described as follows (also note that the last-mentioned copending application, incorporated herein by reference, describes a generally similar flap deploying arrangement):

Fixedly arranged on the pipe section 5 to either side of the jet pipe 10 is a mounting pad 16 which carries a bracket 17 (the drawings illustrate one set of pad 16 and bracket 17, the other being diametrically opposite thereto). Each bracket 17 contains a hydraulically or pneumatically operated control piston 19 (FIG. 2) which slides axially in a cylinder 18 and the piston rod 20 of which terminates in a rack 21 which engages with circumferential teeth on the hubs 22 of main levers 24 pivoting about cross axes 23. Extension or retraction of the rack 21 operated by the control piston 19 causes the main levers 24 to move through a circular arc about axes 23.

The jet deflector flaps 13 are pivotally supported at the pointed 25 of the main levers 24.

Unlike the main levers 24 which move through an arc, the thrust deflector flaps 13 move along an extremely flat curve when folding and deploying. This is achieved by means of positioning levers 26 arranged on the fixedly mounted sections 25' of the flaps 13. Coupled with the positioning levers 26 are push or pull rods 27 which move along tracks 29 by means of rollers 28. These tracks 29 each have an eccentric (relative to the pivot points 23 of the main levers 24), flatly curved shape.

Then when the respective adjacent main levers 24 on one side of the jet pipe 10 move towards each other for thrust reversal (toward dash line showing in FIG. 1), or when they move apart for folding and storing the thrust deflector flaps 13, the eccentricity between the pivotal points 23 of the main levers 24 and the tracks 29 is balanced by means of guide slots 30 of the main levers 24. The ends of the push or pull rods 27 take the shape of rollers for movement within the guide slots 30.

The above-described flatly curved movement of the jet deflector flaps 13 affords an advantage in that it minimizes aerodynamic losses in the tail area of the aircraft or nacelle which accommodates the engine. This flatly curved movement provides a further advantage in that excessively abrupt deploying movement of the flaps early in the thrust reversing process as a result of the prevailing outside air flow is prevented.

Figure 2:
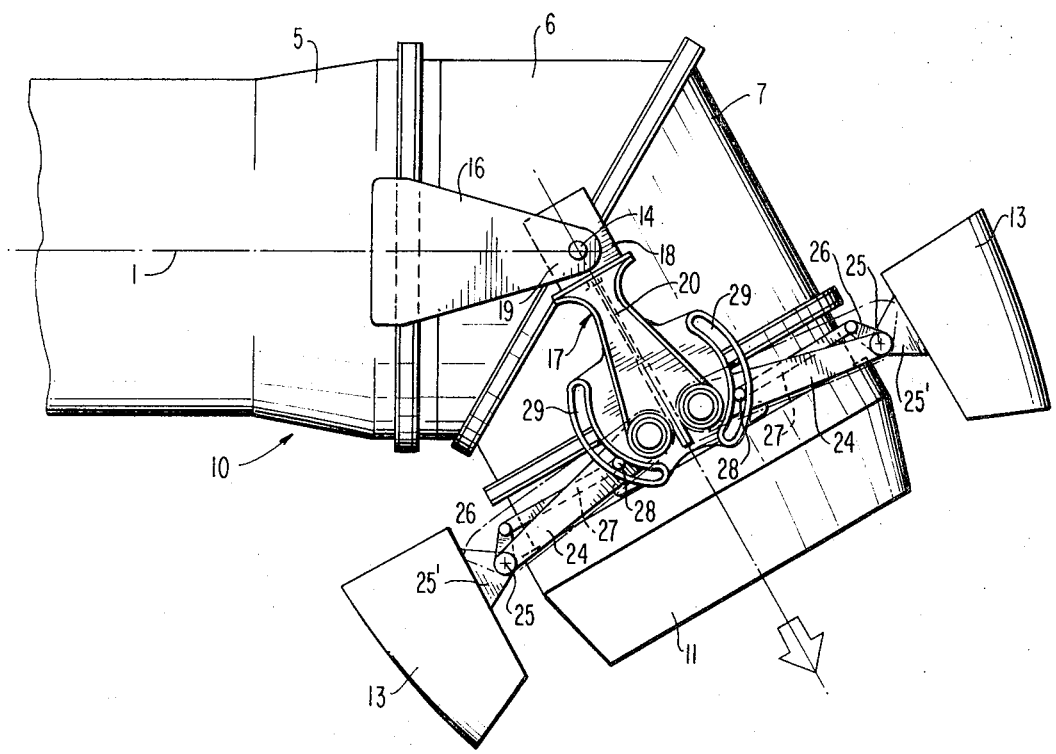
FIG. 2 is a schematic side view of the engine of FIG. 1 with the jet pipe shown in a second extreme position.

The embodiment shown in FIG. 1 and FIG. 2 is suitable also for two turbojet engines arranged parallelly side by side in the tail end of the aircraft fuselage.

Figure 3:
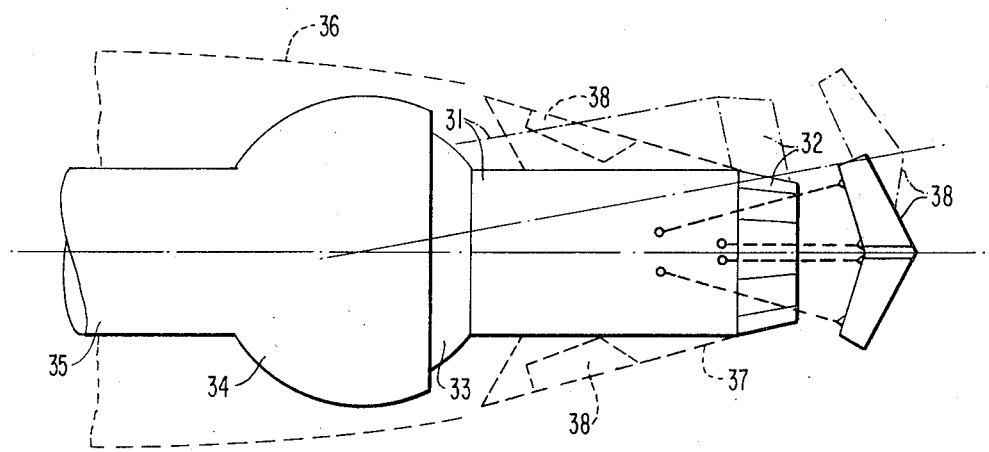
FIG. 3 is a schematic side view of a turbojet engine with a jet exhaust control arrangement constructed in accordance with another preferred embodiment of the presennt invention.

FIG. 3 illustrates another embodiment which has a jet pipe 31 and thrust nozzle 32 admitting of a certain amount of three-dimensionally swiveling movement and so of various control manouvers. The jet pipe 31 is supported for swiveling movement by means of a spherical section 33 within a spherical section 34 of a preceding, fixedly arranged jet pipe section 35. An engine arrangement similar to that described above for the FIG. 1 embodiment supplies thrust gases to the fixed section 35.

The aircraft fuselage 36 here indicated by broken line is continued by a fairing section 37 which is associated with the jet pipe 31 for swiveling movement together with it.

When the thrust reversing means is deactuated, the associated jet deflector flaps 38 are folded into the fairing section 37 (contour indicated by broken line). The contour of jet deflector flaps 38 indicated by solid line is the operating position of the thrust reversing means when the jet pipe 31 is in the horizontal flight position.

When the jet pipe 31 and jet deflector flaps 38 are in the position indicated by dash-dotted line, they would, e.g., not only decelerate the aircraft but additionally raise or otherwise control movement of the aircraft tail.

Because of the three-dimensionally swiveling jet pipe, the arrangement shown in FIG. 3 would readily be able to serve for vertical and lateral control (functions normally at the empennage) also with the thrust reverser in action. The arrangement of FIG. 3 accordingly is also suitable for modern combat aircraft configurations of high maneuvrability which are meant to go without an empennage fitted with elevator and rudder.

The embodiment of FIG. 1 and FIG. 2, as well as that of FIG. 3, further readily embraces the possibility of pivoting the jet deflector flaps 13 or 38 into the engine gas jet to a certain extent only, e.g., for producing a unilaterally reduced lift component (negative lift thrust) for stabilization during vertical take-off. This assumes that further lift engines are arranged in the fuselage or wings to assist in vertical take-off.

Although the illustrated arrangement of FIG. 1 would require longitudinal alignment of the jet pipe 8 with the engine centerline for accommodating movement of the flaps 13 into storage recesses in the fairing (solid line showing of flaps 13), it is also contemplated to use a flap moving system as in the FIG. 1 embodiment in conjunction with a pivoted jet pipe having a fairing section movable therewith to accommodate storage of the flaps even with the jet pipe in a pivoted position.

While I have shown and described several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein only schematically but intend to cover all such changes and modifications.

What I claim is:

1. A jet exhaust control arrangement for controlling the exhausting of gases supplied by an engine; said arrangement comprising:
    a relatively fixed pipe section for accepting the gases supplied by the engine,
    a jet pipe means having an upstream end portion communicating directly with the downstream end of said fixed pipe section and having a downstream open end portion for exhausting said gases to provide thrust forces, said jet pipe means including at least one jet pipe section which is pivotal with respect to said fixed pipe section for accommodating directional changes of the gas flow from said downstream end portion with respect to said fixed pipe section,
    and thrust reversing deflecting elements which are movable into and out of the flow of gases through said jet pipe means for accommodating reversal of the thrust forces resulting from the flow of said gases, said deflecting elements being arranged on and movable with the at least one jet pipe section which is pivotal with respect to said fixed pipe section.

2. An arrangement according to claim 1, wherein said deflector elements are constructed so as to deflectingly engage said flow of gases at positions downstream of said downstream open end portion of said jet pipe means.

3. An arrangement according to claim 1, wherein said deflector elements are pivotally connected to said at least one jet pipe section which is pivotal with respect to said fixed pipe section.

4. An arrangement according to claim 1, wherein said jet pipe means includes a pipe section which is rotatably fixed with respect to said fixed pipe section and at least one pipe section which is supported for relative rotation with respect to adjacent pipe sections of said jet pipe means, and wherein said deflecting elements are arranged on the pipe section which is rotatably fixed.

5. An arrangement according to claim 1, wherein said jet pipe means includes: a first pipe section rotatably attached to the downstream end of said fixed pipe section, a second pipe section rotatably attached to the downstream end of said first pipe section, and a third pipe section rotatably attached to the downstream end of said second pipe section; wherein said third pipe section is rotatably fixed with respect to said fixed pipe section, and wherein said deflecting elements are arranged on said third pipe section.

6. An arrangement according to claim 5, wherein said first and second pipe means are connected along a plane extending at an oblique angle with respect to their respective longitudinal axes such that relative rotation of said first and second pipe means effects a change in the angular orientation of the axes of said first pipe section with respect to the axis of said second pipe section.

7. An arrangement according to claim 6, wherein said deflecting elements are connected to bracket means extending from said fixed pipe section to said third pipe section in bypassing relationship to said first and second pipe sections, said bracket means including a pivotal connection for accommodating pivotal movement of said third pipe section with respect to said fixed pipe section resulting from relative rotation of said first and second pipe sections.

8. An arrangement according to claim 7, wherein said third pipe section is a final pipe section fitted with a thrust nozzle constituting said downstream open end portion of said jet pipe means.

9. An arrangement according to claim 8, wherein said jet pipe means is closed from the outside along the length thereof from said fixed pipe section to said thrust nozzle.

10. An arrangement according to claim 9, wherein said deflector elements are constructed so as to deflectingly engage said flow of gases at positions downstream of said downstream open end portion of said jet pipe means.

11. An arrangement according to claim 4, further comprising a fairing section forming a continuation of an aircraft fuselage of an aircraft propelled by said gases, and recess means in said fairing section for accommodating storage of said deflector elements with minimal flow resistance for air flowing along the outside of said fairing section.

12. An arrangement according to claim 11, further comprising deflector element guide means for guiding movement of said deflector elements between said recess means and thrust reversing positions in the flow of said gases.

13. An arrangement according to claim 12, wherein said deflector elements are constructed so as to deflectingly engage said flow of gases at positions downstream of said downstream open end portion of said jet pipe means.

14. An arrangement according to claim 13, further comprising jet pipe angle control means for effecting relative pivotal movement of said jet pipe means and said fixed pipe section.

15. An arrangement according to claim 12, wherein said guide means include means for assuring compound pivotal movement of said deflector elements along a path having a larger radius of curvature than a circle.

16. An arrangement according to claim 11, wherein said jet pipe means is a single jet pipe section which is pivotally connected to said fixed pipe section by way of a spherical bulge in said fixed pipe section engaging over a correspondingly shaped spherical bulge in said single jet pipe section.

17. An arrangement according to claim 16, wherein said recess means is on said single jet pipe section in a fairing section attached to and movable with said single jet pipe section.

18. An arrangement according to claim 2, wherein said jet pipe means is a single jet pipe section which is pivotally connected to said fixed pipe section by way of a spherical bulge in said fixed pipe section engaging over a correspondingly shaped spherical bulge in said single jet pipe section.

19. An arrangement according to claim 2, further comprising adjusting means for moving said deflector elements between operative positions in deflecting engagement with the flow of gases and inoperative positions out of the flow of gases, wherein said deflecting elements includes a pair of flap members, disposed at respective opposite sides of a centerline of said pipe means, and wherein said adjusting means includes a main pivot lever for each flap member, each of said main pivot levers being pivotal at one end about a respective pivot axis which is fixed in position with respect to said pipe section, the respective other ends of each of said main pivot levers being pivotally connected to respective flap members, wherein a pull-push rod is provided between each flap member and a respective guide path extending eccentrically with respect to the fixed pivot axis of the associated main pivot lever, each of said pull-push rods having one end pivotally attached at the respective flap member by way of a pivotal connection spaced from the pivotal connection between said associated main pivot lever and respective flap member and the other opposite end slideably guided in the respective guide path such that pivotal movement of said main levers along a circular arc about the respective fixed pivot axes effects a flatly curved path of movement of said flap members between operative and inoperative positions thereof.

20. An arrangement according to claim 2, further comprising adjusting means for moving said deflector elements between operative positions in deflecting engagement with the flow of gases and inoperative positions out of the flow of gases, wherein said deflecting elements includes a pair of flap members, disposed at respective opposite sides of a centerline of said jet pipe means, and wherein said adjusting means includes: main pivot levers, each main pivot lever being connected at one end thereof to a flap member of said first flap means and at the other end thereof to a fixed pivot support of said engine, a toothed rack movable between and engageable with two of said main pivot levers to cause counterrotational movement of said two main pivot levers, and power means for moving said toothed rack.

21. An arrangement according to claim 19, wherein each main pivot lever is provided with a guide slot engageable with the end of the respective pull-push rod in the respective guide path.

22. An arrangement according to claim 20, wherein said power means includes one of hydraulic, pneumatic and electric means.

23. An arrangement according to claim 1, wherein said engine is a turbo-jet engine of bypassing construction connected immediately upstream of said fixed pipe section.

* * * * *